Dec. 22, 1959 N. A. CRITES 2,918,271
TWISTED SPRING ELEMENTS
Filed Aug. 2, 1956

INVENTOR.
Nelson A. Crites
BY *Gray, Mase*
*& Dunson*
ATTORNEYS.

United States Patent Office 2,918,271
Patented Dec. 22, 1959

2,918,271

TWISTED SPRING ELEMENTS

Nelson A. Crites, Columbus, Ohio, assignor, by mesne assignments, to Rockwell-Standard Corporation, Coraopolis, Pa., a corporation of Pennsylvania Application August 2, 1956, Serial No. 601,776

12 Claims. (Cl. 267—1)

This invention relates to composite twisted wire springs. More particularly, it relates to a novel method of making such springs for uses as in vehicle seat structures by which desirable spring characteristics can be readily obtained and controlled.

Certain problems in springs are encountered in the manufacture of vehicle seat spring structures and the like which are not ordinarily met in springs used in more stationary applications. The dynamic properties of the spring structure assume greatly increased importance in comparison to the static properties of the structure. Favorable spring properties for a good ride must be present, but must not lead to a sacrifice in the amount of damping available. In a seat structure which is being repeatedly flexed, the comfort of the sitter is greatly improved if favorable damping properties can be built into the seat structure without a sacrifice of other desirable properties.

An object of the present invention is to provide an elastic composite wire for use in seat spring structures and the like having desirable damping and other spring characteristics. Another object is to provide a method of manufacture of the wire spring elements which provides improved manufacturing control of the spring characteristics of the wire spring elements. A further object is to provide wire spring elements for vehicle seat structures and a method of making them which provides exceptionally favorable damping characteristics. Still further objects and features will be readily apparent from the following disclosure.

At the present time, many spring elements of varying configurations are formed from single strands of hard-drawn wire. However, if composite twisted or braided wires according to the present invention are used in place of the single strands, it is possible to get much better spring characteristics and greatly increased manufacturing control of such characteristics. This added control and better spring characteristics may be obtained by controlling the tension of the strands while they are being twisted or braided together to form the composite wire. As a further desirable ramification, one or more of the individual strands used in forming the composite wire may be coated with a resin or a rubber.

Figure 1:
Fig. 1 is a perspective view of a group of three strands twisted together according to the present invention.

As shown in Fig. 1, three strands of wire 5, 6, and 7 are individually twisted into frictional contact with each other. Although three such strands are shown, any number of strands may be twisted as a group according to the present invention, the actual number depending upon the desired use and properties wanted. The strand 7 is shown coated with a resin or a rubber or similar material. If desired, one or more of the twisted plurality of strands may be so coated.

Figure 2:
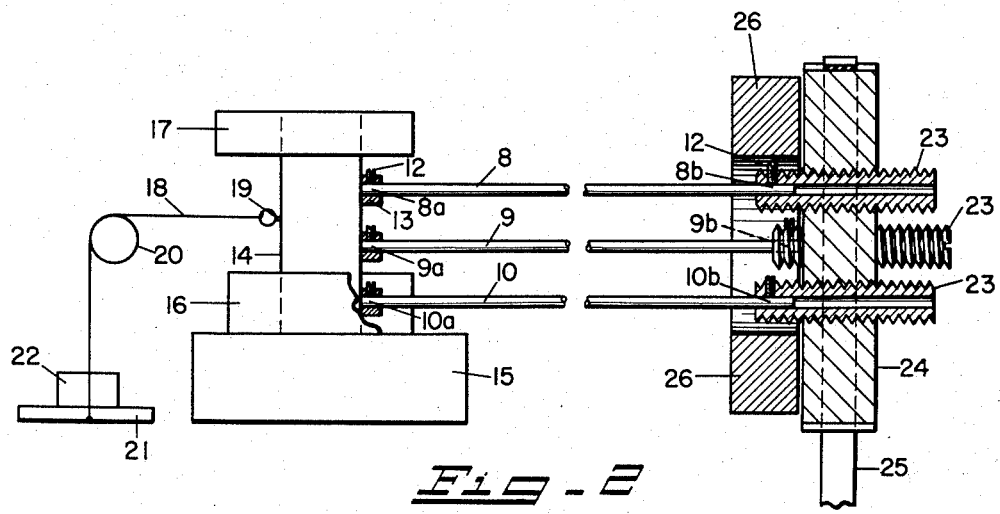
Fig. 2 is a diagrammatic side elevation, including a partial section, of one form of apparatus which may be used in making composite spring elements according to the present invention.

Fig. 2 illustrates apparatus suitable for twisting together the straight wire strands 8, 9 and 10 into a composite twisted wire spring element according to the present invention. One end 8a of the strand 8 is clamped by a pin 12 in a socket 13 secured to a nonrotatable support 14. The support 14 is slidable to the right or left on a base 15 and is guided in such movement by fixed guides 16 and 17. A rope 18 which is secured at 19 to the support 14 passes over a pulley 20 and has a platform 21 secured to its other end for supporting a weight 22. The ends 9a and 10a of strands 9 and 10, respectively, are secured in a similar manner to the nonrotatable support 14.

The end 8b of strand 8 is secured by a pin 12 to a screw 23 which is threaded in an opening in a pulley 24 which is driven by a belt 25 and which may be supported by a shaft, not shown. A bearing 26 prevents movement of the pulley 24 to the left when the strands 8, 9, and 10 are clamped to the support 14 and pulley 24 and longitudinal tension is applied to the strands by placing the weight 22 on platform 21. The ends 9b and 10b of the strands 9 and 10, respectively, are secured in a similar manner to their respective screws 23 which likewise are threaded in openings in the pulley 24. It is preferred that the screws 23 be symmetrically located about the center of the pulley 24.

In carrying out the method according to the invention, the strands 8, 9, and 10 are secured at their ends to the support 14 and pulley 24 while the weight 22 is removed from its platform, a constant longitudinal tension force then is applied to the strands by placing the weight 22 on its platform and then the pulley is rotated while the strands are under this uniform tension to twist the strands together in a controlled manner so as to form a composite twisted wire spring element.

The strands may be placed under tension in different ways. If it is desired that all of the strands be under equal tension during the twisting, all of the strands are merely clamped to the support 14 and pulley 24 without applying any substantial amount of tension to any of them or the screws are adjusted to place all of the strands under equal tension. The weight 22 is then placed on its platform and the pulley is rotated to twist the strands into a composite wire.

If, on the other hand, it is desired that, during twisting, at least one of the strands be under substantially greater longitudinal tension than at least one other of the strands (this being the preferred method), it may be accomplished in the following manner. After clamping the strands to the support 14 and pulley 24, and either before or after the weight 22 has been placed on its platform, at least one of the screws 23 is adjusted to place its strand under a longitudinal tension different from the tension in at least one other of the strands. The pulley 24 is then rotated to twist the strands into the composite wire while applying to all of the strands the constant tension due to the weight 22, each strand, of course, being tensioned to at least the force required for twisting. As illustrated in Fig. 2, the strand 9 has been placed both under greater tension and greater strain than either of the strands 8 or 10 by adjusting the screw for strand 9 to the right relative to the screws for strands 8 and 10, it being assumed that all of the strands are of the same length when in their natural state. Of course, more than one strand can be placed under such uniform greater tension and greater strain than at least one other strand and the strands then twisted into the composite twisted wire. One or more of the strands may be placed under substantially no tension prior to the time that tension is applied by reason of the weight 22 acting on the strands as a group.

A piston and cylinder system or other equivalent can be used in place of the weight-pulley system 22, 20 herein described to maintain a substantially constant tension force between the nonrotatable support 14 and the rotatable support 24.

Instead of mounting the support 14 for movement toward and away from pulley 24, it can be fixed and the pulley or other rotatable support made movable toward and away from support 14, in which case the weight-pulley system 22, 20 or equivalent system would be connected to the movable support.

Figure 3:
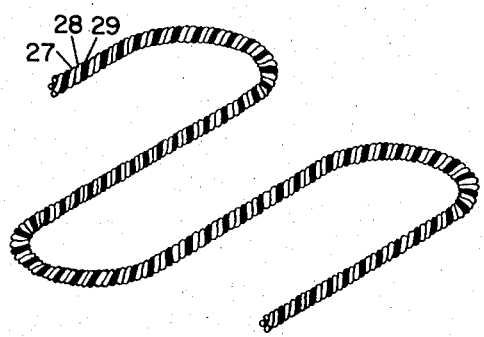
Fig. 3 is a perspective view of one configuration of a composite spring element of the present invention which is useful for vehicle seat structures.

Fig. 3 illustrates ane twisted wire element according to the present invention formed into a zigzag spring arrangement in a configuration adaptable to a vehicle seat structure. Shown are strands 27, 28, and 29, strand 29 being coated or otherwise covered with a resin, rubber, or similar material. The number of strands in the wire element and the type of strand coating for any specific use will, of course, depend upon the wire characteristics desired.

In manufacturing the twisted-wire spring element of the present invention, it is important that the longitudinal tension be applied to at least one of the strands during the twisting operation, since the interaction between the strands is of a more desirable nature and different spring characteristics will ensue than in a case where the composite wire is tensioned after the strands have been twisted. The difference in the final strength property between spring elements manufactured under the two forms of stretching mentioned above is magnified where at least one of the individual strands used in forming the composite wire is coated with a resin or a rubber.

Of course, the tightness to which the strands are twisted will have a further effect on the final characteristics of the composite wire. The coating of at least one strand with a resin or a rubber provides more favorable damping and substantially eliminates noises and squeaks of the spring elements during flexing.

A twisted composite wire manufactured according to the present invention, if used in place of the single strand wire conventionally used in zigzag springs for automobile seat structures, will result in an improved seat spring since the resilience and damping behavior of the composite wire spring elements of the present invention may be closely controlled, and favorable characteristics more easily obtained. Thus, in the manufacture of a twisted wire spring element, the combination of (1) applying substantial longitudinal tension to at least one of a plurality of strands during twisting, and (2) coating at least one of the strands to be twisted with a resin or rubber provides an especially adaptable and controllable composite wire spring element which may be made suitable for the several uses to which it is to be put. Examples of suitable coating substances, depending upon the characteristics desired in the composite twisted wire, are polyethylene (and various other elastomers) and hard rubber.

Spring characteristics, such as resilience and damping behavior, may be controlled by varying (1) the tension of the individual strands during the twisting, (2) the amount of twist given to strands during twisting, (3) the amount and type of strand covering materials used, (4) the configuration of the final spring element made from the composite twisted wire, (5) the shape, size, and physical properties of the single strands of wire used, and (6) the number of strands put under tension while being twisted. It is highly preferred that at least one of the wire strands be put longitudinally under substantially greater tension and greater strain than at least one other strand while being twisted. All sizes of strands which may be found suitable or convenient may be used.

Anyone skilled in the art may, by standard testing procedures, determine which of the many possible modifications of the present invention pointed out above will provide the spring characteristics desired in the composite twisted wire.

From the foregoing disclosure, it is apparent that many modifications and variations of the present invention are possible, and that the optimum modification in any given case will depend upon the uses to which the composite twisted wire spring element is to be put. In accordance with the nature of the present invention, it will be understood, of course, that the words used herein are words of description rather than of limitation and that the invention is not limited to the specific form or arrangement of parts herein described and shown, nor is it limited to specific processes described and shown.

What is claimed is:

1. A method of making a composite twisted wire spring element from a group of straight strands, which comprises applying a substantially constant longitudinal tension force to said group of strands as a whole and applying an increased longitudinal tension force to at least one of said strands so that it differs substantially from the longitudinal tension force on at least one other of said strands, and twisting said group of strands into a composite twisted wire while under the aforesaid substantially constant tension force and increased tension force.

2. A zigzag spring element comprising a composite twisted group of strands, at least one of said strands being under both greater strain and a substantially greater tension than at least one other of said strands, said group being bent in a zigzag structure.

3. A method of making a composite twisted wire spring element from a group of straight strands, which comprises: applying a substantially constant longitudinal tension force to said group of strands as a whole and applying an increased longitudinal tension force and increased longitudinal strain to at least one of said strands so that they differ from the logitudinal tension force and longitudinal strain on at least one other of said strands; and twisting said group of strands into a composite twisted wire while under the aforesaid substantially constant tension force and increased tension force and increased strain.

4. A method of making a composite twisted wire spring element, which comprises twisting together a plurality of straight strands while applying a controlled, constant, substantially greater longitudinal tension force to at least one of said strands than to at least one other of said strands.

5. The method of claim 4 wherein at least one of the plurality of straight strands is covered with a resin.

6. The method of claim 4 wherein at least one of the plurality of straight strands is covered with rubber.

7. The method of claim 4 wherein at least one of the plurality of straight strands is covered with polyethylene.

8. A composite twisted wire spring element comprising a plurality of strands individually twisted together, at least one of said strands being uniformly under both greater longitudinal strain and substantially greater longitudinal tension than at least one other of said strands.

9. The composite twisted wire spring element of claim 8 wherein the twisted plurality of strands is bent in a zigzag structure.

10. The composite twisted wire spring element of claim 8 wherein at least one of the plurality of strands is coated with a material selected from the group consisting of resins and rubbers.

11. The composite twisted wire spring element of claim 10 wherein the twisted plurality of strands is bent in a zigzag structure.

12. The composite twisted wire spring element of claim 10 wherein the material selected is polyethylene.

References Cited in the file of this patent

UNITED STATES PATENTS

| | | |
|---|---|---|
| 99,475 | Rhinelander | Feb. 1, 1870 |
| 274,715 | Buckley | Mar. 27, 1883 |
| 1,700,170 | Larned | Jan. 29, 1929 |
| 1,759,410 | Marston | May 20, 1930 |
| 2,079,873 | Reed | May 11, 1937 |
| 2,257,648 | Pierce | Sept. 30, 1941 |
| 2,403,145 | Ulrich | July 2, 1946 |
| 2,650,819 | Marlow | Sept. 1, 1953 |